US012729283B2

(12) United States Patent
Polidar et al.

(10) Patent No.: US 12,729,283 B2
(45) Date of Patent: Sep. 8, 2026

(54) ADDITIVE COMPOSITION AND USE THEREOF, CONDENSATION POLYMER COMPOSITION, MOLDING COMPOUND AND MOLDING COMPOUNDS PRODUCED THEREFROM, AND MOLDED PARTS AND USE THEREOF

(71) Applicant: FRAUNHOFER-GESELLSCHAFT ZUR FÖRDERUNG DER ANGEWANDTEN FORSCHUNG E.V., Munich (DE)

(72) Inventors: Matthias Polidar, Darmstadt (DE); Elke Metzsch-Zilligen, Darmstadt (DE); Rudolf Pfaendner, Darmstadt (DE)

(73) Assignee: Fraunhofer-Gesellschaft zur förderung der angewandten Forschung e.V., Munich (DE)

( * ) Notice: Subject to any disclaimer, the term of this patent is extended or adjusted under 35 U.S.C. 154(b) by 703 days.

(21) Appl. No.: 17/995,978

(22) PCT Filed: Apr. 16, 2021

(86) PCT No.: PCT/EP2021/059980

§ 371 (c)(1),
(2) Date: Oct. 11, 2022

(87) PCT Pub. No.: WO2021/213939

PCT Pub. Date: Oct. 28, 2021

(65) Prior Publication Data

US 2023/0203274 A1 Jun. 29, 2023

(30) Foreign Application Priority Data

Apr. 22, 2020 (DE) .................... 10 2020 205 094.5

(51) Int. Cl.

| | |
|---|---|
| ***C08K 5/098*** | (2006.01) |
| ***C08K 5/00*** | (2006.01) |
| ***C08K 5/524*** | (2006.01) |
| ***C08K 5/527*** | (2006.01) |
| ***C08L 33/08*** | (2006.01) |
| ***C08L 67/04*** | (2006.01) |

(52) U.S. Cl.

CPC ............ *C08K 5/098* (2013.01); *C08K 5/0033* (2013.01); *C08K 5/524* (2013.01); *C08K 5/527* (2013.01); *C08L 33/08* (2013.01); *C08L 67/04* (2013.01)

(58) Field of Classification Search

CPC ...... C08K 5/098; C08K 5/0033; C08K 5/524; C08K 5/527; C08L 33/08; C08L 67/04

See application file for complete search history.

(56) References Cited

U.S. PATENT DOCUMENTS

| | | | | |
|---|---|---|---|---|
| 5,545,681 | A | 8/1996 | Honkonen | |
| 5,744,544 | A | 4/1998 | Pfaendner et al. | |
| 8,431,683 | B2 | 4/2013 | Coszach et al. | |
| 10,138,354 | B2 | 11/2018 | Groos et al. | |
| 10,214,631 | B2 | 2/2019 | Pfaendner et al. | |
| 10,323,136 | B2 | 6/2019 | Pfaendner et al. | |
| 10,364,340 | B2 | 7/2019 | Pfaendner et al. | |
| 10,370,537 | B2 | 8/2019 | Pfaendner et al. | |
| 10,450,442 | B2 | 10/2019 | Pfaendner et al. | |
| 10,544,284 | B2 | 1/2020 | Pfaendner et al. | |
| 10,781,296 | B2 | 9/2020 | Groos et al. | |
| 10,913,743 | B2 | 2/2021 | Pfaendner et al. | |
| 11,292,859 | B2 | 4/2022 | Klein et al. | |
| 11,407,720 | B2 | 8/2022 | Fischer et al. | |
| 11,591,450 | B2 | 2/2023 | Pfaendner et al. | |
| 11,634,560 | B2 | 4/2023 | Ciesielski et al. | |
| 11,760,865 | B2 | 9/2023 | Pfaendner et al. | |
| 2012/0142958 | A1 | 6/2012 | Coszach et al. | |
| 2014/0360728 | A1 | 12/2014 | Tashiro et al. | |
| 2015/0328373 | A1* | 11/2015 | Pacetti | A61L 31/14 523/113 |
| 2016/0052927 | A1 | 2/2016 | Pfaendner et al. | |
| 2016/0272789 | A1 | 9/2016 | Pfaendner et al. | |
| 2017/0107375 | A1 | 4/2017 | Pfaendner et al. | |
| 2017/0121499 | A1 | 5/2017 | Pfaendner et al. | |
| 2017/0260362 | A1 | 9/2017 | Pfaendner et al. | |
| 2017/0260363 | A1 | 9/2017 | Pfaendner et al. | |
| 2017/0260366 | A1 | 9/2017 | Pfaendner et al. | |
| 2017/0267835 | A1 | 9/2017 | Groos et al. | |
| 2018/0186970 | A1 | 7/2018 | Groos et al. | |
| 2019/0248927 | A1 | 8/2019 | Klein et al. | |

(Continued)

FOREIGN PATENT DOCUMENTS

| | | | |
|---|---|---|---|
| CN | 101020780 | A | 8/2007 |
| CN | 101362833 | A | 2/2009 |

(Continued)

OTHER PUBLICATIONS

English machine translation of CN 106349665A. (Year: 2017).*
Negoro et al. Three-dimensional Structure of Nylon Hydrolase and Mechanism of Nylon-6 Hydrolysis. The Journal of Biological Chemistry vol. 287, No. 7, pp. 5079-5090, Feb. 10, 2012 (Year: 2012).*
English machine translation of CN 106280409A (Year: 2017).*
U.S. Appl. No. 18/245,065, filed Mar. 13, 2023, Pfaendner.
U.S. Appl. No. 18/251,255, filed May 1, 2023, Mayer et al.
U.S. Appl. No. 18/548,504, filed Aug. 31, 2023, Pfaendner et al.
U.S. Appl. No. 18/548,518, filed Aug. 31, 2023, Pfaendner et al.

(Continued)

*Primary Examiner* — John E Uselding

(74) *Attorney, Agent, or Firm* — Leydig, Voit & Mayer, Ltd.

(57) ABSTRACT

Disclosed is a method for increasing method for increasing the hydrolytic degradation of a condensation polymer, which includes adding an additive composition comprising a) at least one hydroxycarboxylic acid salt and b) at least one organic phosphorus compound to the condensation polymer to obtain a mixture and exposing the mixture to a hydrolyzing condition.

1 Claim, No Drawings

(56) References Cited

U.S. PATENT DOCUMENTS

| | | | |
|---|---|---|---|
| 2020/0231783 | A1 | 7/2020 | Pfaendner et al. |
| 2020/0317886 | A1 | 10/2020 | Pfaendner et al. |
| 2020/0361879 | A1 | 11/2020 | Fischer et al. |
| 2021/0130582 | A1 | 5/2021 | Ciesielski et al. |
| 2021/0388176 | A1 | 12/2021 | Metzsch-Zilligen et al. |
| 2022/0073734 | A1 | 3/2022 | Polidar et al. |
| 2022/0119624 | A1 | 4/2022 | Pfaendner et al. |
| 2022/0162422 | A1 | 5/2022 | Pfaendner |
| 2022/0267568 | A1 | 8/2022 | Pfaendner |
| 2022/0340717 | A1 | 10/2022 | Olschewski et al. |
| 2023/0117792 | A1 | 4/2023 | Pfaendner et al. |
| 2023/0119120 | A1 | 4/2023 | Pfaendner et al. |
| 2023/0174746 | A1 | 6/2023 | Polidar et al. |
| 2023/0203274 | A1 | 6/2023 | Polidar et al. |
| 2024/0026124 | A1 | 1/2024 | Pfaendner |
| 2024/0043745 | A1 | 2/2024 | Mayer et al. |
| 2024/0174840 | A1 | 5/2024 | Pfaendner et al. |

FOREIGN PATENT DOCUMENTS

| | | | | | |
|---|---|---|---|---|---|
| CN | 103408827 | A | | 11/2013 | |
| CN | 105838049 | A | | 8/2016 | |
| CN | 106280409 | A | * | 1/2017 | ............... C08K 5/09 |
| CN | 106349665 | A | | 1/2017 | |
| CN | 110643158 | A | | 1/2020 | |
| JP | H05-179245 | A | | 7/1993 | |
| JP | H09-194627 | A | | 7/1997 | |
| JP | H10503791 | A | | 4/1998 | |
| JP | 2006-328222 | A | | 12/2006 | |
| JP | 2007-332361 | A | | 12/2007 | |
| JP | 2008-179713 | A | | 8/2008 | |
| JP | 2009-249508 | A | | 10/2009 | |
| JP | 2012-523442 | A | | 10/2012 | |
| JP | 2015-172114 | A | | 10/2015 | |
| JP | 2015172113 | A | | 10/2015 | |
| KR | 10-0362894 | B1 | | 1/2003 | |
| KR | 10-0367047 | B1 | | 4/2003 | |
| WO | WO 2005/063037 | A1 | | 7/2005 | |
| WO | WO 2011/102861 | A1 | | 8/2011 | |
| WO | 2014/020519 | A2 | | 2/2014 | |
| WO | WO 2020/123986 | A1 | | 6/2020 | |

OTHER PUBLICATIONS

U.S. Appl. No. 18/549,802, filed Sep. 8, 2023, Hallstein et al.
U.S. Appl. No. 18/561,878, filed Nov. 17, 2023, Pfaendner et al.
U.S. Appl. No. 14/442,606, filed May 13, 2015.
U.S. Appl. No. 14/779,849, filed Sep. 24, 2015.
U.S. Appl. No. 15/311,674, filed Nov. 16, 2016.
U.S. Appl. No. 15/317,899, filed Dec. 9, 2016.
U.S. Appl. No. 15/511,410, filed Mar. 15, 2017.
U.S. Appl. No. 15/511,471, filed Mar. 15, 2017.
U.S. Appl. No. 15/511,445, filed Mar. 15, 2017.
U.S. Appl. No. 15/529,026, filed May 23, 2017.
U.S. Appl. No. 15/738,515, filed Dec. 20, 2017.
U.S. Appl. No. 16/344,830, filed Apr. 25, 2019.
U.S. Appl. No. 16/488,902, filed Aug. 26, 2019.
U.S. Appl. No. 16/633,645, filed Jan. 24, 2020.
U.S. Appl. No. 16/649,656, filed Mar. 22, 2020.
U.S. Appl. No. 16/764,291, filed May 14, 2020.
U.S. Appl. No. 17/287,079, filed Apr. 20, 2021.
U.S. Appl. No. 17/423,800, filed Jul. 16, 2021.
U.S. Appl. No. 17/425,267, filed Jul. 22, 2021.
U.S. Appl. No. 17/441,626, filed Sep. 21, 2021.
U.S. Appl. No. 17/625,387, filed Jan. 7, 2022.
U.S. Appl. No. 17/640,174, filed Mar. 3, 2022.
U.S. Appl. No. 17/906,080, filed Sep. 12, 2022.
U.S. Appl. No. 17/907,038, filed Sep. 22, 2022.
U.S. Appl. No. 17/999,747, filed Oct. 20, 2022.
Georgiopoulos et al., "The effect of silica nanoparticles on the thermomechanical properties and degradation behavior of polylactic acid," *Journal of Biomaterials Applications* 29(5): 662-674 (2014).
European Patent Office, International Search Report in International Application No. PCT/EP2021/059980 (Jul. 13, 2021).
European Patent Office, Written Opinion in International Application No. PCT/EP2021/059980 (Jul. 13, 2021).
International Bureau of WIPO, International Preliminary Report on Patentability in International Application No. PCT/EP2021/059980 (Oct. 25, 2022).
Elsawy et al., "Hydrolytic degradation of polylactic acid (PLA) and its composites," *Renewable and Sustainable Energy Reviews* 79: 1346-1352 (2017).
Göpferich, "Mechanisms of polymer degradation and erosion," *Biomaterials* 17(2):103-114 (1996).
Pattanasuttichonlakul et al., "Accelerating biodegradation of PLA using microbial consortium from dairy wastewater sludge combined with PLA-degrading bacterium," *International Biodeterioration and Biodegradation* 132: 74-83 (2018).
Wang et al., "Accelerated hydrolytic degradation of poly(lactic acid) achieved by adding poly(butylene succinate)," *Polymer Bulletin* 73: 1067-1083 (2016).
U.S. Appl. No. 18/708,977, filed May 9, 2024, Pfaendner et al.
Luo et al., "Effects of TiO2 nanoparticles on the photodegradation of poly(lactic acid)," *J. Appl. Polym. Sci.* 135(30): 46509 (2018) (pp. 1-8).
Korean Intellectual Property Office, Request for Submission of an Opinion (Office Action) in Korean Patent Application No. 10-2022-7040954 (Oct. 27, 2025).
Japan Patent Office, Notice of Reasons for Rejection in Japanese Patent Application No. 2022-563924 (Dec. 16, 2025).

* cited by examiner

ADDITIVE COMPOSITION AND USE THEREOF, CONDENSATION POLYMER COMPOSITION, MOLDING COMPOUND AND MOLDING COMPOUNDS PRODUCED THEREFROM, AND MOLDED PARTS AND USE THEREOF

CROSS-REFERENCE TO RELATED APPLICATIONS

This patent application is the U.S. national phase of International Application No. PCT/EP2021/059980, filed on Apr. 16, 2021, which claims the benefit of German Patent Application No. 10 2020 205 094.5, filed Apr. 22, 2020, the disclosures of which are incorporated herein by reference in their entireties for all purposes.

The invention relates to an additive composition comprising at least one hydroxycarboxylic acid salt and at least one organic phosphorus compound, said composition being capable of accelerating the hydrolytic degradation of a thermoplastic condensation polymer during use upon incorporation of said additive composition. The invention additionally relates to a condensation polymer composition which is supplemented with an additive composition according to the invention. The invention additionally relates to a method for the hydrolytic degradation of a thermoplastic condensation polymer and to uses of the additive composition according to the invention and of the thermoplastic condensation polymer composition.

Condensation polymers, such as polyesters, for example PET, and polyamides, such as PA-6, are important plastics for packaging and technical applications which are often also intended for long-term uses. Furthermore, polyester-based polymers formed from renewable raw materials such as PLA (polylactide) or PBS (polybutylene succinate) are nowadays considered to be a possible substitute material for oil-based plastics, particularly in the packaging industry and for agricultural applications. These applications, however, for example in the form of films, tend to have a short service life. Regardless of the service life, however, it is necessary that condensation polymers do not experience any (prior) damage during the manufacture of parts or during compounding, so as not to suffer prematurely from any loss of properties, for example with regard to their mechanical properties. For this purpose, additives, such as stabilisers and/or antioxidants, are often added to the polymers.

A range of possibilities have been described for an accelerated degradation of polycondensation polymers, in particular of polylactic acid. For example, the degradation can be accelerated by particular ambient conditions, for example by the use of selected microorganisms (W. Pattanasuttichonlakul et al., International Biodeterioration and Biodegradation 2018, 132, 74-83) or of enzymes (WO 2005/063037).

Other possibilities are the addition of degradation-promoting additives in order to achieve a photocatalytic degradation, such as $TiO_2$ nanoparticles (Y. Luo et al. J. Appl. Pol. Sci. 2018, 46509, 1-8) or silica nanoparticles (P. Georgiopoulus et al. Journal of Biomaterials Applications 2014, 29, 662-674) or oxidation-promoting additives such as manganese stearate (CN 103408827).

Furthermore, methods are known which, due to the addition of inorganic substances such as MgO or ZnO (US 2014/0360728) or organic fillers such as chitosan or keratin (M. A. Elsawy et al. Renewable and Sustainable Energy Reviews 2017, 79, 1346-1352), influence the degradation of PLA.

In addition, PLA blends in combination with quickly degradable polymers have been described, such as PLA blends with polybutylene succinate (Y. Wang et al. Polym. Bull. 2016, 73, 1067-1083).

The previously known methods for accelerated degradation are either to be used only following the production of plastics parts (microorganisms, enzymes) or fundamentally change the degradation characteristics (photochemically, oxidatively) or the properties of the material (fillers, blends). It is furthermore known that the degradation occurs at low or high pH values (acidic or base-catalysed ester cleaving, A. Göpferich, Biomaterials 1996, 17, 103-114), an acid or base environment in processing is, however, counterproductive since great damage to the polymer thereby already takes place.

Hydroxycarboxylic acids are mentioned in the form of sodium citrate in CN 105838049 as additives to shape-memory polylactic acid composites, but as fillers in a list with other typical fillers, such as calcium carbonate or talc and not as stabilisers.

In CN 101020780, in the case of polylactic acid-wood composites, sodium citrate inter alia is mentioned as nucleation agent in a list with various additives, such as calcium carbonate, but is not used as stabiliser.

In CN 101362833 sodium citrate is used as foam stabiliser in the production of polylactic acids within a list of coupling agents, but not as polymer stabiliser.

JP 2006-328222 uses salts of hydroxycarboxylic acids to stabilise polyacetal/polylactic acid blends, but to reduce the formaldehyde cleaving.

Furthermore, in JP H05-179245 mention is made of ester salts of hydroxycarboxylic acids as stabilisers for various polymers.

The object of the present invention was therefore to develop an additive composition that on the one hand allows a processing of the polycondensation polymers without or only with little (prior) damage, i.e., acts in a stabilising manner in the thermoplastic processing of the polymer, and on the other hand, if necessary, accelerates or controls a hydrolytic degradation in the environment.

This object is achieved in relation to an additive composition for accelerating the hydrolytic degradation of thermoplastic condensation polymers with the features described herein, in relation to a condensation polymer composition with the features described herein, in relation to a moulding compound or a moulded part with the features described herein, in relation to a method for the hydrolytic degradation of condensation polymers with the features described herein, in relation to a use of an additive composition with the features described herein, and in relation to uses of the condensation polymer compositions with the features also described herein, and the advantageous developments thereof.

The invention therefore relates in a first aspect to an additive composition, comprising or consisting of a) at least one hydroxycarboxylic acid salt and b) at least one organic phosphorus compound.

It could surprisingly be found that the additive composition according to the invention allows the production of condensation polymer compositions with accelerated hydrolytic degradation in the environment without premature loss of properties during the processing.

For example, the additive composition according to the invention can be incorporated during the thermal processing of the condensation polymers into the condensation polymer composition, in particular by addition, supplementation or incorporation to or into the thermoplastic condensation polymers.

An exemplary thermal processing of the condensation polymers can be, for example, the processing in the thermoplastic state, wherein the condensation polymer is generally melted, preferably by mixer, kneader or extruder. Extruders, such as single-screw extruders, twin-screw extruders, planetary roller extruders, ring extruders, co-kneaders, which are preferably equipped with vacuum degassing, are preferred as processing machines. The processing can take place here under air or, optionally, under inert gas conditions. Here, the addition or incorporation of the additive composition can take place during the processing.

It is also possible to mix the additive composition prior to the thermal processing with the thermoplastic condensation polymers, which for example can be present in the form of chips, powder, beads or pellets, and to then process the mixture in the thermoplastic state.

The thermal process is performed preferably under aprotic conditions. The expression "under aprotic conditions" is understood to mean that compounds which can easily give away a proton are absent, for example acids or also water. In particular, aprotic conditions are characterised in that the thermoplastic condensation polymer has a water content of up to 0.5 wt. %, preferably up to 0.05 wt. %. For this reason, the additives according to the invention are preferably also present in anhydrous form.

It is also essential here that the carboxylic acid salt contains a hydroxy group, whereby the use according to the invention of conventional acid scavengers containing no hydroxy groups, such as calcium stearate, differs. It is assumed for the operating principle that the hydroxy group interrupts radical degradation mechanisms by hydrogen transfer, while at the same time a neutral or stable pH value can be maintained and a complexing with the oxidation-promoting metal ions are postulated as a further effect.

Preferred hydroxycarboxylic acid salts are selected for example from the group consisting of alkali metal salts, alkaline earth metal salts, aluminium salts and zinc salts of hydroxycarboxylic acids, in particular hydroxycarboxylic acids selected from the group consisting of alpha, beta, gamma, delta or omega hydroxycarboxylic acids, preferably linear or branched aliphatic or aromatic hydroxycarboxylic acid compounds with 2 to 34 carbon atoms and derivatives thereof (for example cyclic hydroxycarboxylic acid esters, such as lactones, or anhydrides from which the hydroxycarboxylic acids can be obtained again, but also hydroxycarboxylic acids of similar structure), in particular hydroxyethanoic acid (glycolic acid), D-, L-, D-L-2-hydroxypropanoic acid (D-, L-, D-L-lactic acid, 2-hydroxypropionic acid), 3-hydroxypropanoic acid (3-hydroxypropionic acid), 2-hydroxybutanoic acid (2-hydroxybutanoic acid), 3-hydroxybutanoic acid (3-hydroxybutanoic acid), 4-hydroxybutanoic acid (4-hydroxybutanoic acid), hydroxypentanoic acid (hydroxyvaleric acid), hydroxyhexanoic acid (hydroxycaproic acid), hydroxyheptanoic acid (hydroxyenanthic acid), hydroxyoctanoic acid (hydroxycaprylic acid), hydroxynonanoic acid (hydroxypelargonic acid), hydroxydecanoic acid (hydroxycapric acid), hydroxyundecanoic acid, hydroxydodecanoic acid (hydroxylauric acid), hydroxytridecanoic acid, hydroxytetradecanoic acid (hydroxymyristic acid), hydroxypentadecanoic acid, hydroxyhexadecanoic acid (hydroxypalmitic acid), hydroxyheptadecanoic acid (hydroxymargaric acid), hydroxyoctadecanoic acid (hydroxystearic acid), hydroxynonadecanoic acid, hydroxyeicosanoic acid (hydroxyacharic acid), hydroxyheneicosanoic acid, hydroxydocosanoic acid (hydroxybehenic acid), hydroxytricosanoic acid, hydroxytetracosanoic acid (hydroxylignoceric acid), hydroxypentacosanoic acid, hydroxyhexacosanoic acid (hydroxycerotinic acid), hydroxyheptacosanoic acid, hydroxyoctacosanoic acid (hydroxymontanoic acid), hydroxynonacosanoic acid, hydroxytriacontanoic acid (hydroxymelissic acid), hydroxydotriacontanoic acid (hydroxylaccanoic acid), hydroxytetratriacontanoic acid (hydroxygeddic acid), hydroxycarboxylic acids substituted with alkyl groups and/or carbonyl groups, such as 2-hydroxy-2-methyl-propanic acid (2-hydroxyisobutanoic acid), 2-hydroxy-2-methyl-butanoic acid, 3-hydroxy-3-methyl-butanoic acid and 2-hydroxy-2-methyl-3-oxobutanoic acid; dihydroxycarboxylic acids such as mevalonic acid and glyceric acid; polyhydroxycarboxylic acids such as quinic acid, isosaccharic acid, lactobionic acid. Further suitable hydroxycarboxylic acids are aldonic acids, such as aldotetronic acids, such as aldopentonic acids, aldohexonic acids, in particular gluconic acid, ribonic acid, arabinonic acid, xylonic acid, mannonic acid, galactonic acid, gulonic acid, ketoaldonic acids, uronic acids such as glucuronic acid, mannuronic acid, galacturonic acid, and aldaric acids such as glucaric acid, xylaric acid, galactaric acid, gularic acid; long-chain and unsaturated hydroxycarboxylic acids such as ricinoleic acid; aromatic hydroxycarboxylic acids such as mandelic acid, vanillin mandelic acid and dibasic or tribasic hydroxycarboxylic acids such as malic acid, citric acid, isocitric acid or tartaric acid. Furthermore, oligosaccharides or polysaccharides having carboxylic acid and hydroxy groups in the repeating unit are preferred, such as polygalacturonic acid, polymannuronic acid, polyguluronic acid, and in particular alginic acid according to formula 1

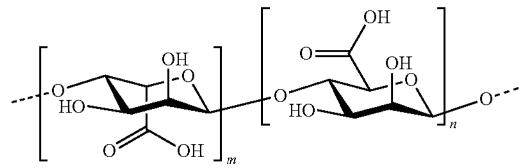

m, n=5-100

Particularly preferred are sodium citrate (trisodium citrate), calcium citrate (tricalcium dicitrate), sodium malate (disodium malate), calcium malate, sodium tartrate and sodium alginate The water-of-crystallisation-free forms of the stated salts are very particularly preferred. Here, water-of-crystallisation-free salts are considered to be salts that lose at most 10 wt. % crystallisation of water under the particular processing conditions. This also includes in particular salts that can be transferred into this state by routine drying methods.

The organic phosphorus compound is preferably hydrolysable and thus contains at least one ester group, preferably two, particularly preferably 3 ester groups. The hydrolysis stability of esters of the phosphorous acid is dependent on the structure of the particular alcohol. Aromatic polyesters, i.e. phenol derivatives and sterically hindered structures, have a higher hydrolytic resistance than aliphatic structures, i.e. alcohol derivatives. The organic phosphorus compound preferably comprises at least 1, particularly preferably at least 2, very particularly preferably 3 aliphatic ester groups per P atom. Furthermore, in particular linear ester groups. i.e. with low steric hindrance, are preferred.

A further preferred embodiment provides that the organic phosphorous compound is selected from the group consisting of phosphites with one, two or 3 linear or branched alkoxy groups or phosphites selected from the group consisting of

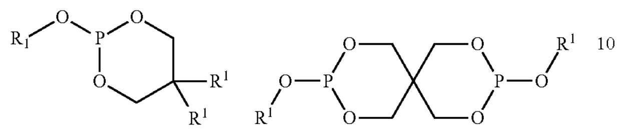

wherein $R^1$ at each occurrence is the same or different and is selected from the group consisting of linear or branched alky groups with 1 to 36 carbon atoms and aryl groups, and compounds of formula $P(OR^1)_3$, wherein $R^1$ is selected from the group consisting of linear or branched alkyl groups with 4 to 32 carbon atoms, in particular trilauryl phosphite, triisodecyl phosphite, tridecyl phosphite, trihexadecyl phosphite, trioctadecyl phosphite, tribehenyl phosphite, triarachidyl phosphite, triceryl phosphite, trioleyl phosphite trioleyl phosphite and tris(2-ethylhexyl)phosphite, diphosphites and higher molecular homologues and partially esterified phosphonic acid compounds such as monostearyl phosphite (or the tautomeric form thereof monostearyl phosphonate) or distearyl phosphite (distearyl phosphonate), and alkaline salts, earth alkaline salts, aluminium salts or zinc salts thereof. Examples of a diphosphite are tetraethyl diphosphite or tetrapropyl diphosphite. An example of a triphosphite is the P,P'-bis(2-hydroxyethyl) ester of triphosphorigenic acid. Oligophosphites and polyphosphites (oligomeric and polymeric phosphites) are described for example in WO 2011/102861, WO 2014/020519 or WO 2020/123986. The compounds stated there are also included by the present invention, and by way of example the following compounds:

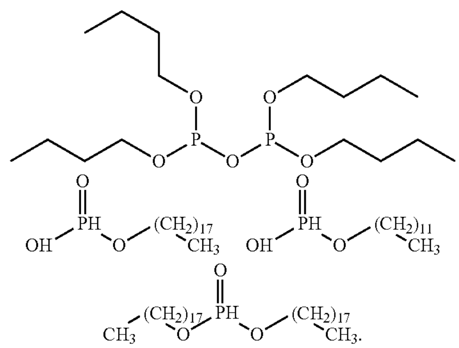

Also included are phosphates, diphosphates, metaphosphates and polyphosphates which are derived from the previously mentioned phosphites, such as trilauryl phosphate, triisodecyl phosphate, tridecyl phosphate, trihexadecyl phosphate, trioctadecyl phosphate, tribehenyl phosphate, triarachidyl phosphate, triceryl phosphate, trioleyl phosphate and also, for example, the following structures and salts derived therefrom, and mixtures of at least two phosphates consisting of the group of monoalkyl phosphates, dialkyl phosphates and trialkyl phosphates:

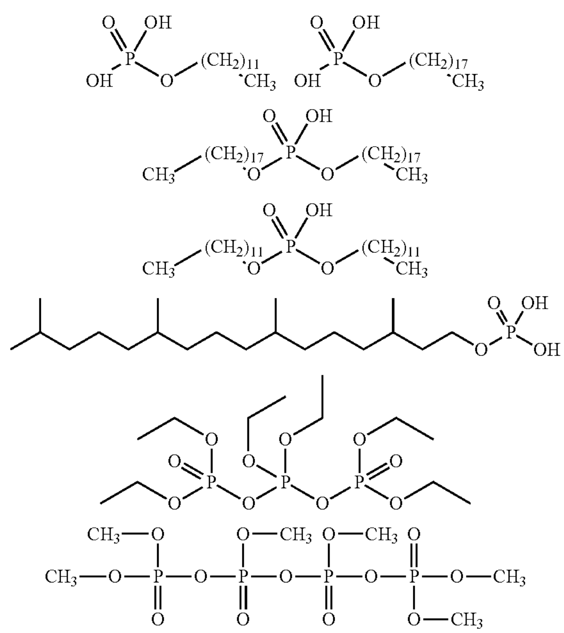

In the case of the aforementioned phosphates, diphosphates, metaphosphates and polyphosphates derived from the aforementioned phosphites, the phosphorus atom is present in the oxidation stage +V-instead of +III as in the phosphites.

It is very particularly preferred that the organic phosphorus compound is a phosphite and is selected from the group consisting of the following compounds:

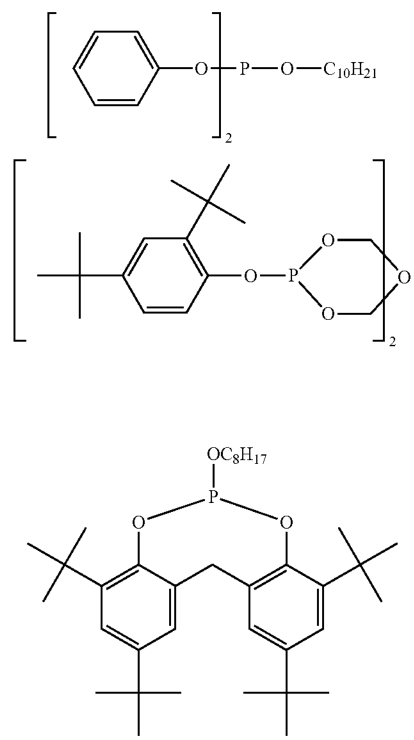

-continued
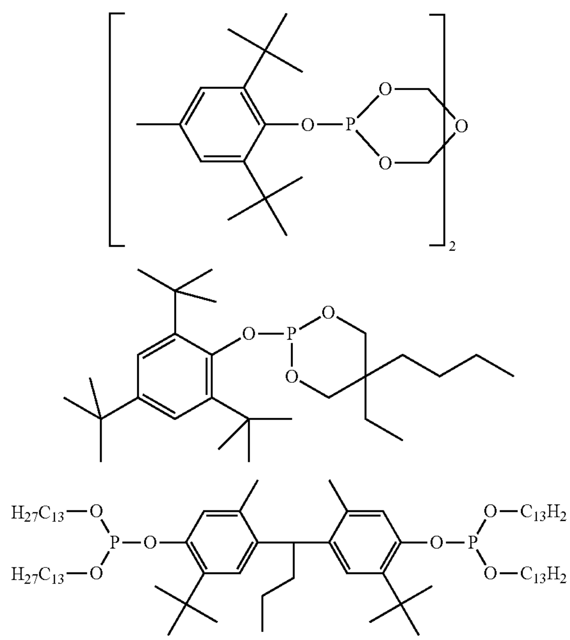
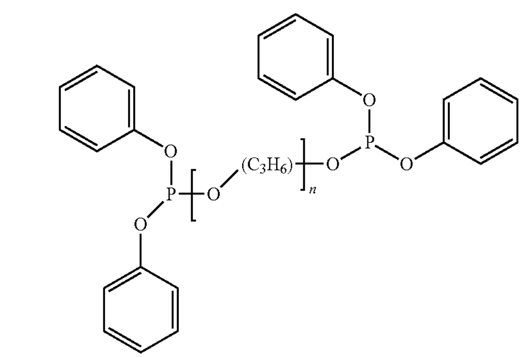
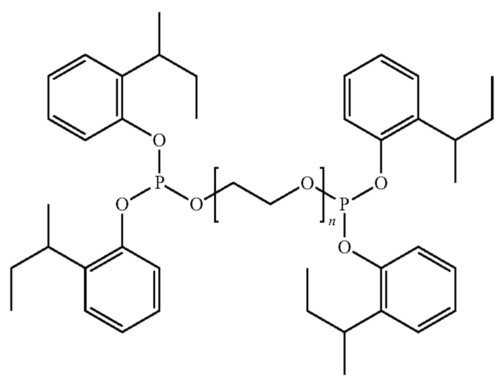
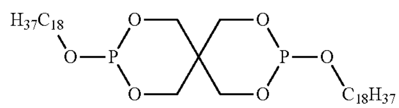
-continued
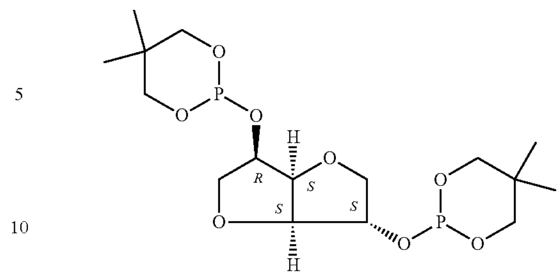
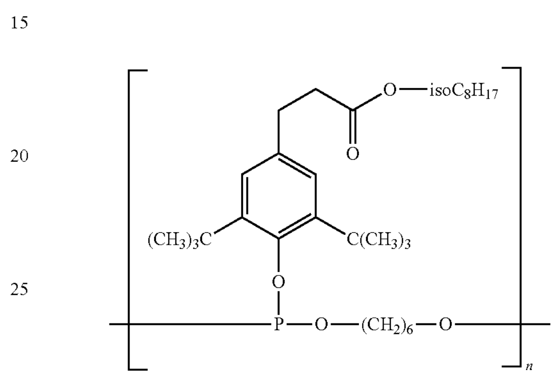
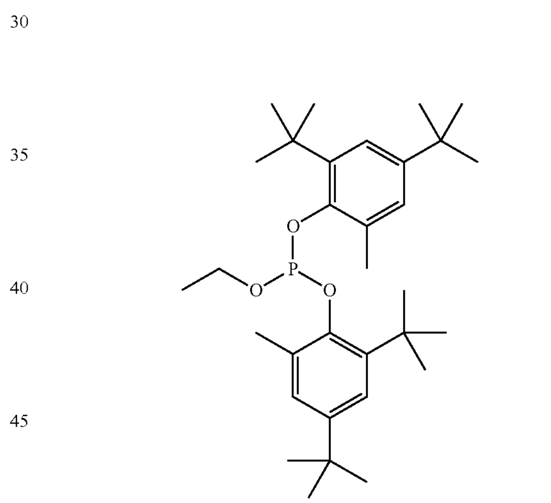
wherein n is from 3 to 100
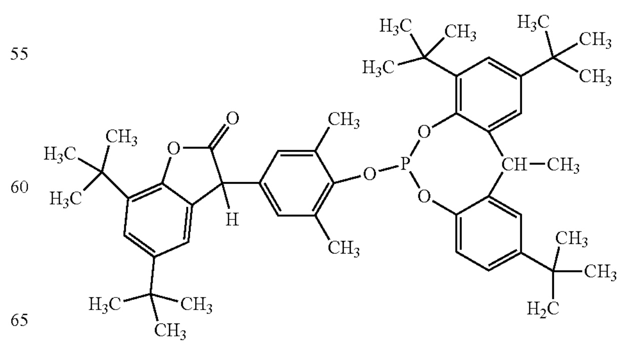

-continued

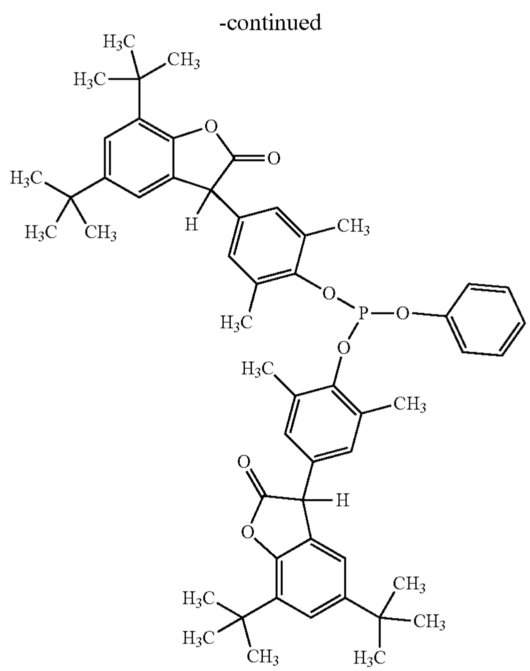

A preferred phosphonite usable for the purposes of the present invention is the following compound:

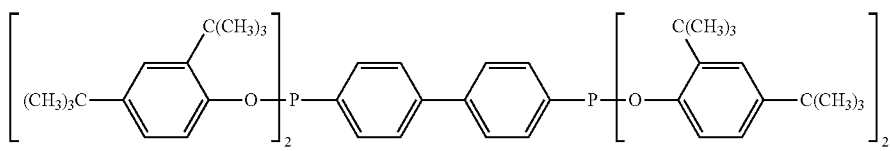

In accordance with a further preferred embodiment, the totality of the at least one hydroxycarboxylic acid salt and the totality of the at least one organic phosphorus compound is present in a ratio by weight of from 20:1 to 1:20, preferably from 10:1 to 1:10, particularly preferably from 5:1 to 1:5.

In accordance with a further aspect, the present invention relates to a condensation polymer composition comprising or consisting of a) at least one condensation polymer and b) an additive composition according to the invention.

In accordance with a further a preferred embodiment it is provided that the condensation polymer is selected from the group consisting of polyesters of aliphatic or aromatic dicarboxylic acids and diols or of hydroxycarboxylic acids, such as polylactic acid (PLA), polybutylene succinate, polybutylene succinate-co-adipate, poly(butylene adipate) (PBA), polyethylene terephthalate (PET), polybutylene terephthalate (PBT), polyethylene furanoate (poly(ethylene-2,5-furandicarboxylate)) (PEF), polypropylene terephthalate (PPT), polyethylene naphthylate, poly-1,4-dimethylolcyclohexane terephthalate, polyhydroxybenzoate, polyhydroxynaphthalate, polycaprolactone (PCL), poly-3-hydroxybutyrate, poly-4-hydroxybutyrate, poly-3-hydroxyvalerate, poly(hexamethylene succinate), poly (butylene succinate), and copolymers and mixtures or blends of two or more of the aforementioned polymers;

polyamides such as PA 6, PA 6.6, PA 6.10, PA 4.6, PA 4.10, PA 6.12, PA 10.10, PA 10.12, PA 12.12, PA 11, PA 12;

semiaromatic polyamides such as polypththalamides, e.g. prepared from terephthalic acid and/or isophthalic acid and aliphatic diamines or of aliphatic dicarboxylic acids such as adipic acid or sebacic acid and aromatic diamines such as 1,4- or 1,3-diamine benzene;

polycarbonates or polyester carbonates;

and mixtures, combinations or blends of two or more of the aforementioned polymers.

Preferred condensation polymers are aliphatic polyesters which are obtained from aliphatic diols such as ethylene glycol, 1,3-propanediol, 1,2-propanediol, 1,4-butanediol, 1,5-pentanediol, neopentyl glycol, 1,6-hexanediol and aliphatic dicarboxylic acids such as malonic acid, succinic acid, glutaric acid, adipic acid, pimelic acid, suberic acid, azelaic acid, sebacic acid, brassylic acid, fumaric acid or itaconic acid as well as from hydroxycarboxylic acids or ring-forming compounds thereof, such as polycaprolactone, poly-3-hydroxybutyrate, poly-4-hydroxybutyrate, poly-3-hydroxyvalerate, poly(hexamethylene succinate), poly (butylene succinate), poly(butylene succinate-co-adipate), polylactic acid.

In particular, the condensation polymer is selected from the group consisting of PLA, PBA, and copolymers thereof, wherein the PLA copolymers were preferably obtained by ring-opening polymerisation of D-lactide and/or L-lactide with comonomers selected from hydrocarboxylic acids, in particular glycolic acid, 4-hydroxybutanoic acid, 3-hydroxybutanoic acid, 3-hydroxyvaleric acid, or mandelic acid; diols, in particular ethylene glycol or butane diol; and/or carboxylic acids, in particular adipic acid or terephthalic acid.

In the condensation polymer composition according to the invention it is preferred if, in relation to the total condensation polymer composition, the additive composition is contained in an amount of from 0.01 to 10.00 wt. %, preferably 0.05 to 5.00 wt. %, particularly preferably from 0.10 to 2.00 wt. %.

The condensation polymer composition according to the invention can additionally contain at least one additive that is selected from the group consisting of primary antioxidants, secondary antioxidants, UV absorbers, light stabilisers, metal deactivators, filler deactivators, antiozonants, nucleation agents, anti-nucleation agents, toughening agents, lubricants, rheological modifiers, thixotropic agents, chain extenders, processing aids, mould release agents, flame retardants, pigments, dyes, optical brighteners, antimicrobial active agents, antistatic agents, slip agents, antiblocking agents, coupling agents, crosslinking agents, anti-cross-linking agents, hydrophilisation agents, hydrophobing agents, hydrolysis stabilisers, bonding agents, dispersing agents, compatibilisers, oxygen scavengers, acid scavengers, expanding agents, degradation additives, defoaming agents, odor scavengers, marking agents and anti-fogging agents.

It is advantageous here if, in relation to the total condensation polymer composition, the at least one additive is contained in an amount of from 0.01 to 5.00 wt. %, preferably 0.05 to 3.00 wt. %, particularly preferably from 0.10 to 1.00 wt. %.

Plasticisers, fibres such as glass fibres and/or carbon fibres, and fillers are not included among the additives. Should plasticisers, fibres and/or filler be contained in the condensation polymer composition, these substances can be contained in their totality in an amount up to 80 parts by weight, in relation to 100 parts by weight of the above-described condensation polymer composition.

In a preferred embodiment the compositions contain in particular further classes of nucleation agent, additives for increasing the molecular weight (chain extenders) or fillers.

Preferred nucleation agents are, talcum, alkaline salts, or alkaline earth salts of monofunctional and polyfunctional carboxylic acids such as benzoic acid, succinic acid, adipic acid, e.g. sodium benzoate, zinc glycerolate, aluminiumhydroxy-bis(4-tert-butyl)benzoate, 2,2-methylene-bis-(4,6-di-tert-butylphenyl)phosphate, and trisamides and diamides such as trimesic acid tricyclohexylamide, trimesic acid tri (4-methylcyclohexylamide), trimesic acid tri(tert-butylamide), N,N',N"-1,3,5-benzoltriyltris(2,2-dimethyl-propanamide) or 2,6-naphthalene dicarboxylic acid cyclohexylamide or orotic acid.

Preferred additives for increasing the molecular weight (chain extenders) are diepoxides, bis-oxazolines, bis-oxazolones, bis-oxazines, diisocyanates, dianhydrides, bis-acyllactams, bis-maleimides, dicyanates, carbodiimides. Further suitable chain extenders are polymeric compounds, such as polystyrene-polyacrylate-polyglycidyl (meth)acrylate copolymers, polystyrene-maleic anhydride copolymers and polyethylene-maleic anhydride copolymers.

Preferred fillers and/or reinforcing materials are calcium carbonates, silicates, talcum, mica, kaolin, metal oxides and metal hydroxides, black carbon, graphite, wood flour or fibres of natural products such as cellulose; glass fibres, carbon fibres, polyaramide fibres and other synthetic polymer fibres. Further suitable fillers are hydrotalcites or zeolites or phyllosilicates such as montmorillonite, bentonite, beidellite, mica, hectorite, saponite, vermiculite, ledikite, magadite, illite, kaolinite, wollastonite, attapulgite.

Examples of further additives that may additionally contain the compositions according to the invention are primary and secondary antioxidants:

Suitable primary antioxidants (A) are phenolic antioxidants, amines and lactones.

Suitable phenolic antioxidants are, for example:

- alkylated monophenols, such as 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-($\alpha$-methylcyclohexyl)-4,6-dimethylphenol, 2,6-dioctadecyl-4-methylphenol, 2,4,6-tricyclohexylphenol, 2,6-di-tert-butyl-4-methoxymethylphenol, linear or branched nonylphenols such as 2,6-dinonyl-4-methylphenol, 2,4-dimethyl-6-(1'-methylundec-1'-yl) phenol, 2,4-dimethyl-6-(1'-methylheptadec-1'-yl) phenol, 2,4-dimethyl-6-(1'-methyltridec-1'-yl) phenol and mixtures thereof;
- alkylthiomethyl phenols, such as 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol;
- hydroquinones and alkylated hydroquinones, such as e.g. 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxylphenyl) adipate;
- tocopherols, such as $\alpha$-, $\beta$-, $\gamma$-, $\delta$-tocopherol and mixtures hereof (vitamin E);
- hydroxylated thiodiphenyl ethers, such as 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)disulfide;
- alkylidene bisphenols, such as 2,2'methylenebis(6-tert-butyl-4-methylphenol), 2,2'-methylenebis(6-tert-butyl-4-ethylphenol), 2,2'-methylenebis[4-methyl-6-($\alpha$-methylcyclohexyl) phenol], 2,2'-methylenebis(4-methyl-6-cyclhexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-($\alpha$-methylbenzyl)-4-nonylphenol], 2,2'-methylenebis[6-($\alpha$,$\alpha$-dimethylbenzyl)-4-nonylphenol], 4,4'-methylenebis(2,6-di-tert-butylphenol, 4,4'-methylenebis(6-tert-butyl-2-methylphenol), 1,1-bis(5-tert-butyl-4-hydroxy-2-methylphenyl)butane, 2,6-bis (3-tert-butyl-5-methyl-2-hydroxybenzyl)-4-methylphenol, 1,1,3-tris(5-tert-butyl-4-hydroxy-2-methylphenyl) butane, 1,1-bis(5-tert-butyl-4-hydroxy-2-methylphenyl)-3-n-dodecylmercaptobutane, ethylene glycol-bis[3,3-bis(3'-tert-butyl-4'-hydroxyphenyl) butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl] terephthalate, 1,1-bis-(3,5-dimethyl-2-hydroxyphenyl) butane, 2,2-bis(3,5-di-tert-butyl-4-hydroxyphenyl) propane, 2,2-bis-(5-tert-butyl-4-hydroxy-2-methylphenyl)-4-n-dodecylmercaptobutane, 1,1,5,5-tetra(5-tert-butyl-4-hydroxy-2-methylphenyl) pentane;
- O-, N- and S-benzyl compounds, such as 3,5,3',5'-tetra-tert-butyl-4,4'-dihydroxydibenzylether, octadecyl-4-hydroxy-3,5-dimethylbenzylmercaptoacetate, tridecyl-4-hydroxy-3,5-di-tert-butylbenzylmercaptoacetate, tris (3,5-di-tert-butyl-4-hydroxybenzyl)amine, bis(4-tert-butyl-3-hydroxy-2,6-dimethylbenzyl) dithioterephthalate, bis(3,5-di-tert-butyl-4-hydroxybenzyl) sulfide, isooctyl-3,5-di-tert-butyl-4-hydroxybenzylmercaptoacetate;
- hydroxybenzylated malonates, such as dioctadecyl-2,2-bis(3,5-di-tert-butyl-2-hydroxybenzyl) malonate, dioctadecyl-2-(3-tert-butyl-4-hydroxy-5-methylbenzyl) malonate, didodecylmercaptoethyl-2,2-bis(3,5-di-tert-butyl-4-hydroxybenzyl) malonate, bis[4-(1,1,3,3-tetramethylbutyl)phenyl]-2,2-bis(3,5-di-tert-butyl-4-hydroxybenzyl) malonate;
- aromatic hydroxybenzyl compounds, such as 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl) phenol;
- triazine compounds, such as 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris (3,5-di-tert-butyl-4-hydroxyphenoxy)-1,2,3-triazine, 1,3,5-tris(3,5-di-tert-butyl-4-hydroxybenzyl) isocyanurate, 1,3,5-tris(4-tert-butyl-3-hydroxy-2,6-dimethylbenzyl) isocyanurate, 2,4,6-tris(3,5-di-tert-butyl-4-hydroxphenylethyl)-1,3,5-triazine, 1,3,5-tris(3,5-di-tert-butyl-4-hydroxyphenylpropionyl) hexahydro-1,3,5-triazine, 1,3,5-tris(3,5-dicyclohexyl-4-hydroxybenzyl) isocyanurate;

benzyl phosphonates, such as dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethylester of 3,5-di-tert-butyl-4-hydroxybenzylphosphonic acid;

acylaminophenols, such as 4-hydroxylauranilide, 4-hydroxystearanilide, octyl-N-(3,5-di-tert-butyl-4-hydroxyphenyl) carbamate;

esters of β-(3,5-di-tert-butyl-4-hydroxyphenyl) propionic acid with monohydric or polyhydric alcohols, for example methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis (hydroxyethyl) oxamide, 3-thiaundecanol, 3-thiapentadecanol, trimethylhexanediol, trimethylolpropane, 4-hydroxymethyl-1-phospha-2,6,7-trioxabicyclo [2.2.2]octane;

esters of β-(5-tert-butyl-4-hydroxy-3-methylphenyl) propionic acid with monohydric or polyhydric alcohols, for example methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis (hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane, 3,9-bis[2-{3-(3-tert-butyl-4-hydroxy-5-methylphenyl) propionyloxy}-1,1-dimethylethyl]-2,4,8,10-tetraoxaspiro[5.5]undecane;

esters of β-(3,5-dicyclohexyl-4-hydroxyphenyl) propionic acid with monohydric or polyhydric alcohols, for example methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane;

esters of (3,5-di-tert-butyl-4-hydroxyphenyl) acetic acid with monohydric or polyhydric alcohols, for example methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane;

amides of β-(3,5-di-tert-butyl-4-hydroxyphenyl) propionic acid, such as N,N'-bis(3,5-di-tert-butyl-4-hydroxyphenylpropionyl) hexamethylene diamide, N,N'-bis(3,5-di-tert-butyl-4-hydroxyphenylpropionyl) hexamethylene diamide, N,N'-bis(3,5-di-tert-butyl-4-hydroxyphenylpropionyl)hexamethylene diamide, N,N'-bis(3,5-di-tert-butyl-4-hydroxyphenylpropionyl) hydrazide, N,N'-bis[2-(3-[3,5-di-tert-butyl-4-hydroxyphenyl]propionyloxy)ethyl]oxamide (Naugard®XL-1, marketed by Uniroyal);

ascorbic acid (vitamin C).

Particularly preferred phenolic antioxidants are the following structures:

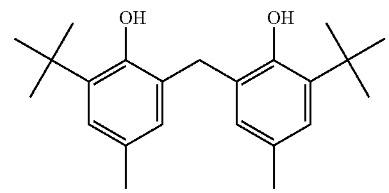

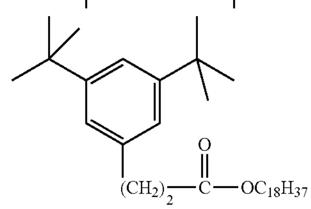

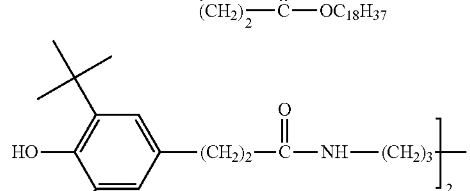

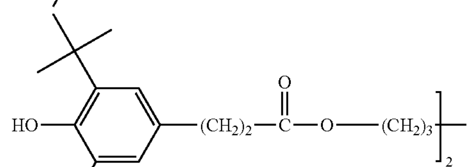

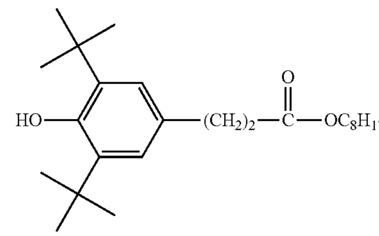

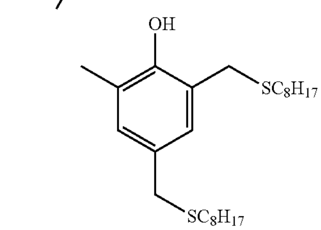

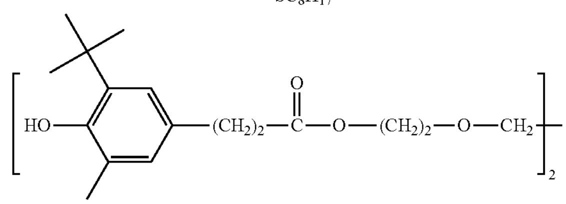

-continued
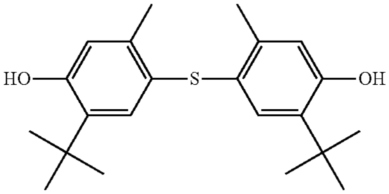
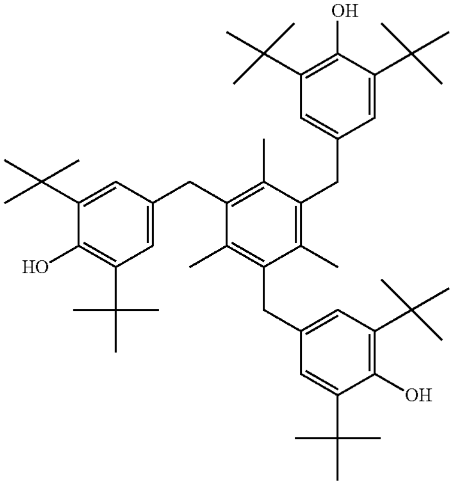
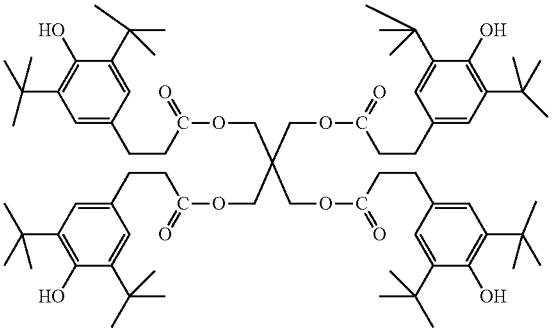
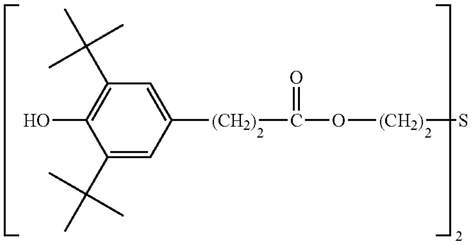
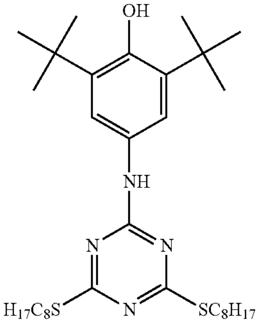
-continued
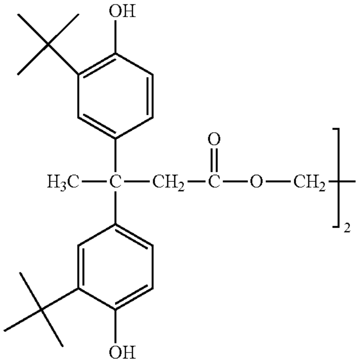
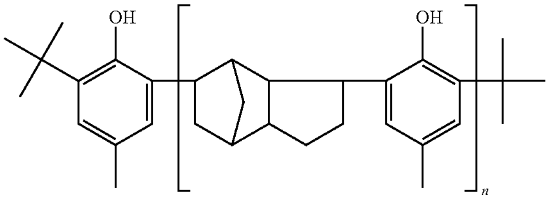
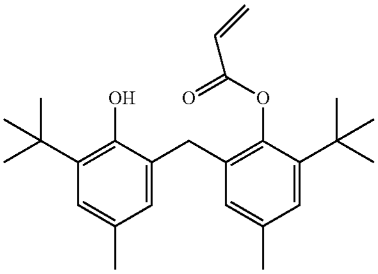
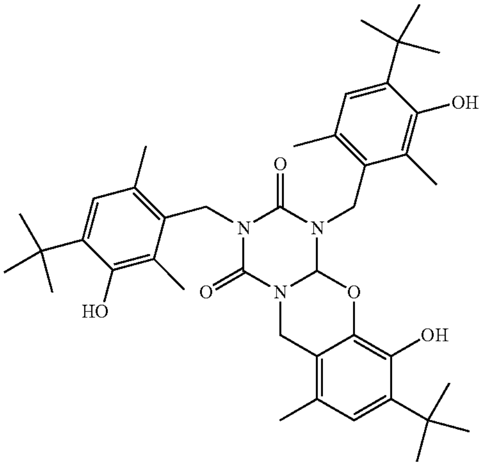

-continued

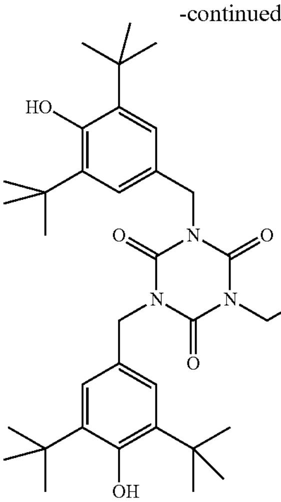

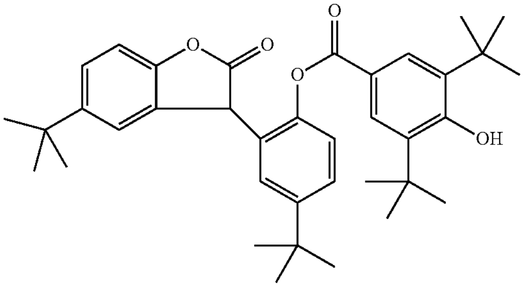

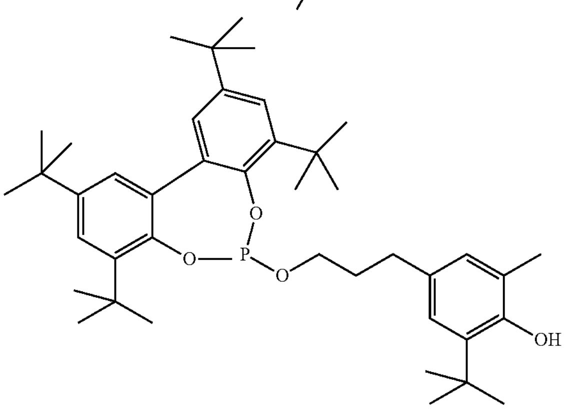

Further particularly preferred phenolic antioxidants are based on renewable raw materials such as e.g. tocopherols (vitamin E), tocotrienols, tocomonoenols, carotenoids, hydroxytyrosol, flavonols such as e.g. chrysin, quercitin, hesperidin, neohesperidin, naringin, morin, kaempferol, fisetin, anthocyanins such as e.g. delphinidin and malvidin, curcumin, carnosolic acid, carnosol, rosmarinic acid and resveratrol.

Suitable aminic antioxidants are, for example:

N,N'-di-isopropyl-p-phenylene diamine, N,N'-di-sec-butyl-p-phenylene diamine, N,N'-bis(1,4-dimethylpentyl)-p-phenylene diamine, N,N'-bis(1-ethyl-3-methylpentyl)-p-phenylene diamine, N,N'-bis(1-methylheptyl)-p-phenylene diamine, N,N'-dicyclohexyl-p-phenylene diamine, N,N'-diphenyl-p-phenylene diamine, N,N'-bis(2-naphthyl)-p-phenylene diamine, N-isopropyl-N'-phenyl-p-phenylene diamine, N-(1,3-dimethylbutyl)-N'-phenyl-p-phenylene diamine, N-(1-methylheptyl)-N'-phenyl-p-phenylene diamine, N-cyclohexyl-N'-phenyl-p-phenylene diamine, 4-(p-toluene sulfamoyl)diphenylamine, N,N'-dimethyl-N,N'-di-sec-butyl-p-phenylene diamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylamino-phenol, bis(4-methoxyphenyl)amine, 2,6-di-tert-butyl-4-dimethylaminomethyl-phenol, 2,4'-diaminodiphenylmethane, 4,4'-diaminodiphenylmethane, N,N,N',N'-tetra-methyl-4,4'-diaminodiphenylmethane, 1,2-bis[(2-methyl-phenyl)amino] ethane, 1,2-bis(phenylamino) propane, (o-tolyl) biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyl-diphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazinene, N-allylphenothiazine, N,N,N',N'-tetraphenyl-1,4-diaminobut-2-ene and mixtures or combinations thereof.

Preferred aminic antioxidants are: N,N'-di-isopropyl-p-phenylenediamine, N,N'-di-sec-butyl-p-phenylenediamine, N,N'-bis(1,4-dimethylpentyl)-p-phenylenediamine, N,N'-bis (1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine Further preferred aminic antioxidants are hydroxylamines or N-oxides (nitrones), such as N,N-dialkylhydroxylamines, N,N-dibenzylhydroxylamine, N,N-dilaurylhydroxylamine, N,N-distearylhydroxylamine, N-benzyl-a-phenylnitrone, N-octadecyl-α-hexadecylnitrone, and Genox EP (Addivant) according to the formula:

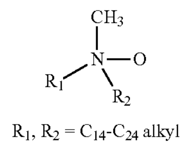

$R_1$, $R_2$ = $C_{14}$-$C_{24}$ alkyl

Suitable lactones are benzofuranones and indolinones, such as 3-(4-(2-acetoxyethoxy)phenyl]-5,7-di-tert-butyl-benzofuran-2-one, 5,7-di-tert-butyl-3-[4-(2-stearoyloxy-ethoxy)phenyl]benzofuran-2-one, 3,3'-bis[5,7-di-tert-butyl-3-(4-(2-hydroxyethoxy]phenyl)benzofuran-2-one), 5,7-di-tert-butyl-3-(4-ethoxy-phenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one, 3-(2,3-dimethylphenyl)-5,7-di-tert-butyl-benzofuran-2-one.

Suitable secondary antioxidants are organosulfur compounds such as sulfides and disulfides, e.g. distearylthiodipropionate, dilaurylthiodipropionate; ditridecyldithiopropionate, ditetradecylthiodipropionate, 3-(dodecylthio)-, 1,1'-

[2,2-bis[[3-(dodecylthio)-1-oxopropoxy]methyl]-1,3-propandiyl]propanoic acid ester.

Suitable light stabilisers are, for example, compounds based on 2-(2'-hydroxyphenyl)benzotriazoles, 2-hydroxybenzophenones, esters of benzoic acids, acrylates, oxamides and 2-(2-hydroxyphenyl)-1,3,5-triazines.

Suitable 2-(2'-hydroxyphenyl)benzotriazoles are, for example, 2-(2'-hydroxy-5'methylphenyl)benzotriazole, 2-(3',5'-di-tert-butyl-2'-hydroxyphenyl)benzotriazole, 2-(5'-tert-butyl-2'-hydroxy-phenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl-5-chlorobenzotriazole, 2-(3'-sec-butyl-5'-tert-butyl-2'-hydroxy-phenyl) benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy) carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl) phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy) carbonylethyl]-2'-hydroxyphenyl) benzotriazole, 2-(3'-dodecyl-2'-hydroxy-5'-methylphenyl) benzotriazole, 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotriazole-2-ylphenol]; the product of the transesterification of 2-[3'-tert-butyl-5'-(2-methoxycarbonylethyl)-2'-hydroxyphenyl]-2H-benzotriazole with polyethyleneglycol 300; $[R—CH_2CH_2—COO—CH_2CH_2—]-2$, where R=3'-tert-butyl-4'-hydroxy-5'-2H-benzotriazole-2-ylphenyl, 2-[2'-hydroxy-3'-(α,α-dimethylbenzyl)-5'-(1,1,3,3-tetramethylbutyl)phenyl]benzotriazole, 2-[2'-hydroxy-3'-(1,1,3,3-tetramethylbutyl)-5'-(α,α-dimethylbenzyl)phenyl] benzotriazole.

Suitable 2-hydroxybenzophenones are, for example, 4-hydroxy-, 4-methoxy-, 4-octyloxy-, 4-decyloxy-4-dodecyloxy, 4-benzyloxy, 4,2',4'-trihydroxy- and 2'-hydroxy-4,4'-dimethyoxy derivatives of the 2-hydroxy benzophenones.

Suitable acrylates are, for example, ethyl-α-cyano-β,β-diphenylacrylate, isooctyl-α-cyano-β,β-diphenylacrylate, methyl-α-carbomethoxycinnamate, methyl-α-cyano-β-methyl-p-methoxycinnamate, butyl-α-cyano-β-methyl-p-methoxycinnamate, methyl-α-carbomethoxy-p-methoxycinnamate and N-(β-carbomethoxy-β-cyanovinyl)-2-methylindoline.

Suitable esters of benzoic acids are, for example, 4-tert-butylphenylsalicylate, phenylsalicylate, octylphenylsalicylate, dibenzoylresorcinol, bis(4-tert-butylbenzoyl)resorcinol, benzoylresorcinol, 2,4-di-tert-butylphenyl-3,5-di-tert-butyl-4-hydroxybenzoate, hexadecyl-3,5-di-tert-butyl-4-hydroxybenzoate, octadecyl-3,5-di-tert-butyl-4-hydroxybenzoate, and 2-methyl-4,6-di-tert-butylphenyl-3,5-di-tert-butyl-4-hydroxybenzoate.

Suitable oxamides are, for example, 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl) oxamide, 2-ethoxy-5-tert-butyl-2'-ethoxanilide and its mixtures with 2-ethoxy-2'-ethyl-5,4'-di-tert-butoxanilide, mixtures of o- and p-methoxy-disubstituted oxanilides and mixtures of o- and p-ethoxy-disubstituted oxanilides.

Suitable 2-(2-hydroxyphenyl)-1,3,5-triazines are, for example, 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis (2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)-phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, and 2-{2-hydroxy-4-[3-(2-ethylhexyl-1-oxy)-2-hydroxypropyloxy]phenyl}-4,6-bis(2,4-dimethylphenyl-1,3,5-triazine.

Suitable metal deactivators are, for example, N,N'-diphenyloxamide, N-salicylal-N'-salicyloylhydrazine, N,N'-bis (salicyloyl) hydrazine, N,N'-bis(3,5-di-tert-butyl-4-hydroxyphenylpropionyl) hydrazine, 3-salicyloylamino-1,2,4-triazole, bis(benzylidene) oxalyldihydrazide, oxanilide, isophthaloyldihydrazide, sebacoyl-bis-phenylhydrazide, N,N'-diacetyladipoyldihydrazide, N,N'-bis(salicyloyl)oxylyldihydrazide, and N,N'-bis(salicyloyl)thiopropionyldihydrazide.

Suitable hindered amines are, for example, 1,1-bis(2,2,6,6-tetramethyl-4-piperidyl) succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl)-n-butyl-3,5-di-tert-butyl-4-hydroxybenzylmalonate, the condensation product of 1-(2-hydroxyethyl)-2,2,6,6-tetramethyl-4-hydroxypiperidine and succinic acid, linear or cyclic condensation products of N,N'-bis(2,2,6,6-tetramethyl-4-piperidyl) hexamethylenediamine and 4-tert-octylamino-2,6-dichloro-1,3,5-triazine, tris (2,2,6,6-tetramethyl-4-piperidyl) nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, linear or cyclic condensation products from N,N'-bis(2,2,6,6-tetramethyl-4-piperidyl) hexamethylenediamine and 4-morpholino-2,6-dichloro-1,3,5-triazine the reaction product of 7,7,9,9-tetramethyl-2-cycloundecyl-1-oxa-3,8-diaza-4-oxospiro-[4,5]decane and epichlorohydrin.

Oligomeric and polymeric hindered amines of the following structures are preferred:

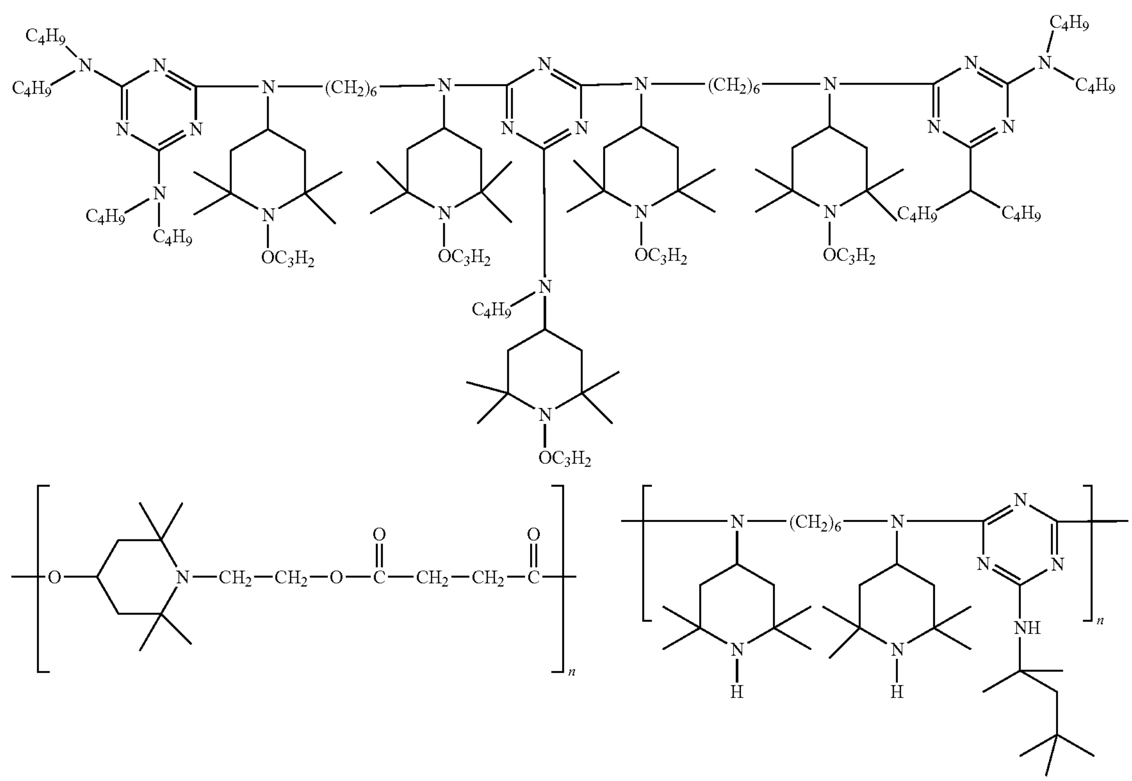
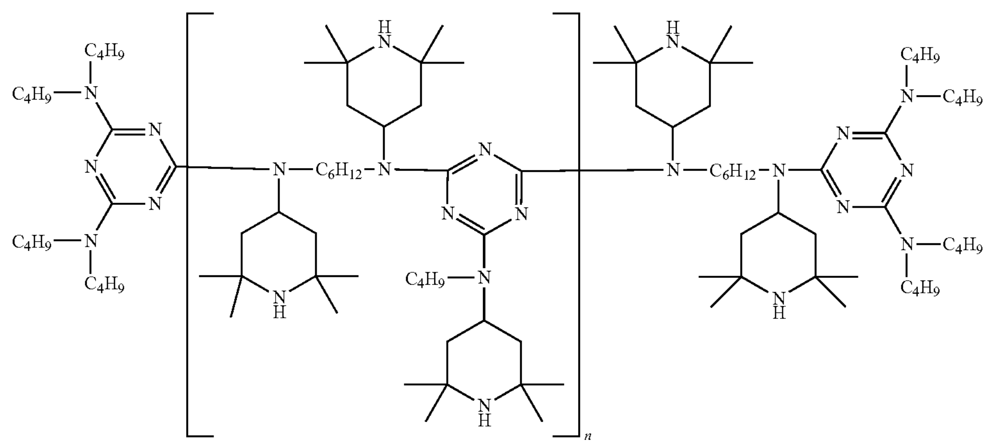
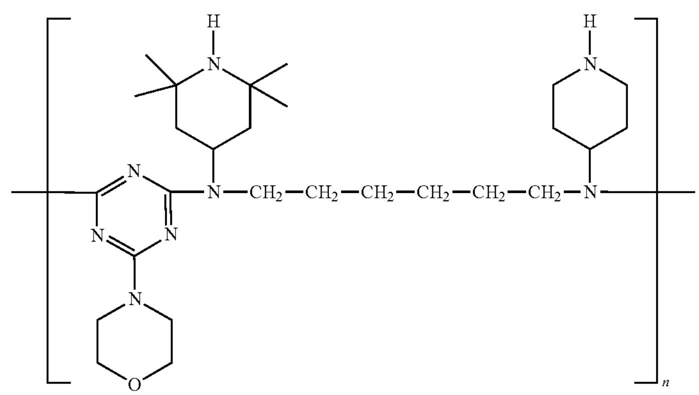

-continued
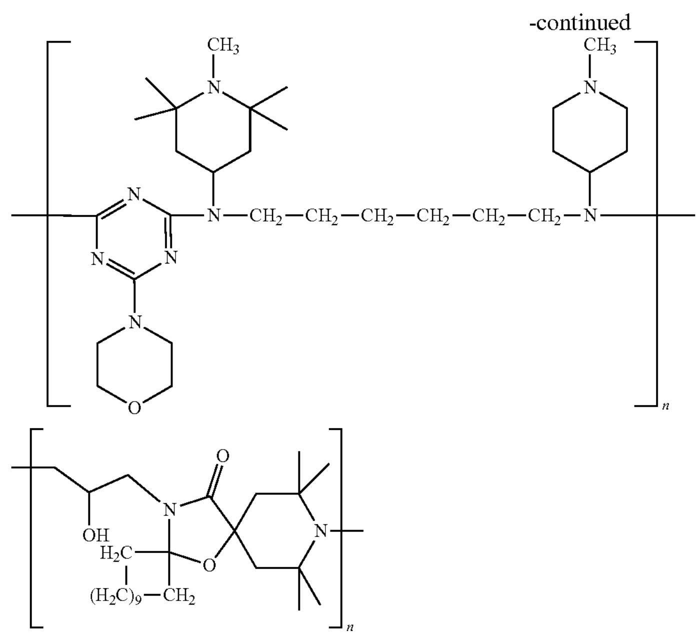
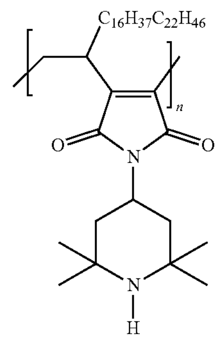
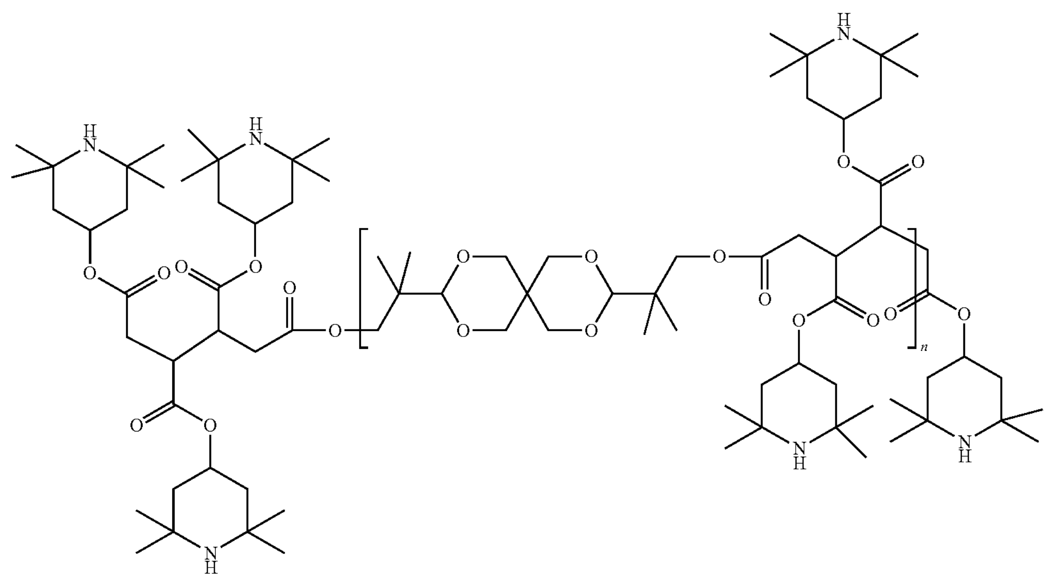
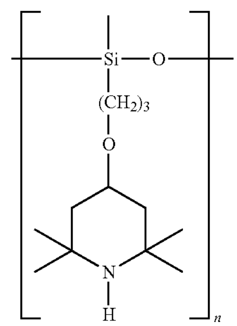

In the above-named compounds, n respectively means 3 to 100.

Suitable dispersing agents are, for example:

polyacrylates, for example, copolymers having long chain side groups, polyacrylate block copolymers, alkylamides: for example, N,N'-1,2-ethanediylbisoctadecanamide sorbitan esters, for example, monostearyl sorbitan esters, titanates and zirconates, reactive copolymers having functional groups, for example, polypropylene-co-acrylic acid, polypropylene-co-maleic anhydride, polyethylene-co-glycidyl methacrylate, and polystyrene-alt-maleic anhydride-polysiloxanes: for example, dimethylsilanediol-ethylene oxide copolymer, polyphenylsiloxane copolymer, and amphiphilic copolymers: for example, polyethylene block polyethylene oxide, and dendrimers, for example, dendrimers comprising hydroxyl groups.

Suitable antinucleating agents are azine dyes, such as nigrosine.

Suitable flame retardant agents are in particular inorganic flame retardant agents such as $Al(OH)_3$, $Mg(OH)_2$, AlO (OH), $MgCO_3$, phyllosilicates such as montmorillonite or sepiolite, unmodified or organically modified double salts such as Mg—Al silicates, POSS (polyhedral oligomeric silsesquioxanes) compounds, huntite, hydromagnesite or halloysite Suitable pigments can be of an inorganic or organic nature. Inorganic pigments are, for example, titanium dioxide, zinc oxide, zinc sulfide, iron oxide, ultramarine, black carbon; organic pigments are, for example, anthraquinones, anthanthrones, benzimidazolones, chinacridones, diketoptyrrolopyrrols, dioxazines, inanthrones, isoindolines, azo compounds, perylenes, phthalocyanines or pyranthrones. Further suitable pigments include effect pigments on a metal basis or pearl gloss pigments on a metal oxide basis.

Suitable optical brighteners are, for example, bis-benzoxazoles, phenylcumarines, or bis(styryl)biphenyls and in particular optical brighteners of the formulas:

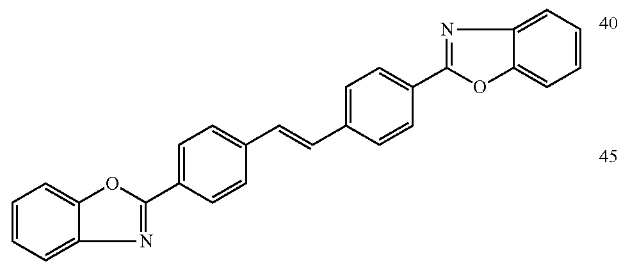

-continued

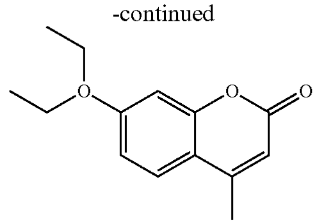

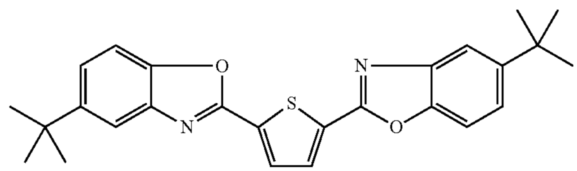

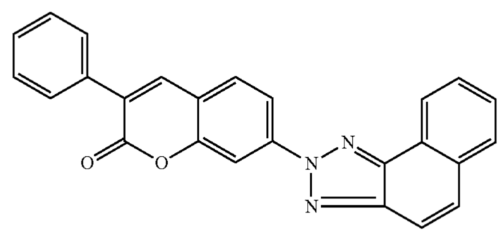

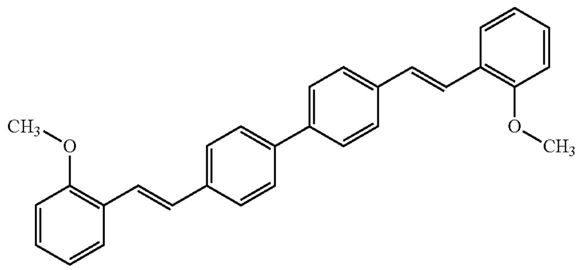

Suitable filler deactivators are, for example, polysiloxanes, polyacrylates, in particular block copolymers like polymethacrylic acid-polyalkylene oxide or polyglycidyl (meth)acrylates and their copolymers for example with styrene, and epoxides, for example, of the following structures:

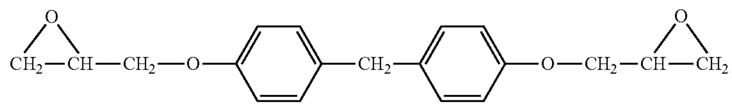

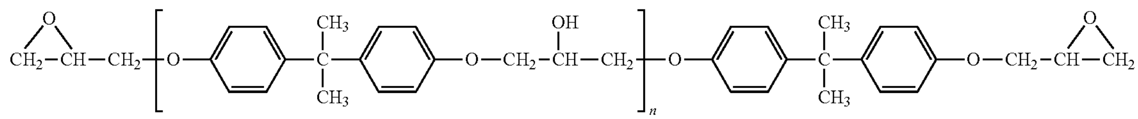

n = 1-10

-continued

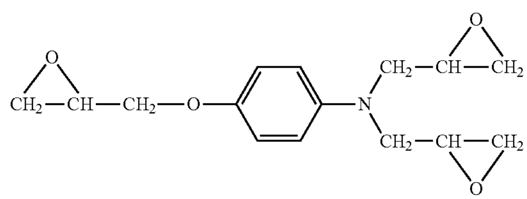

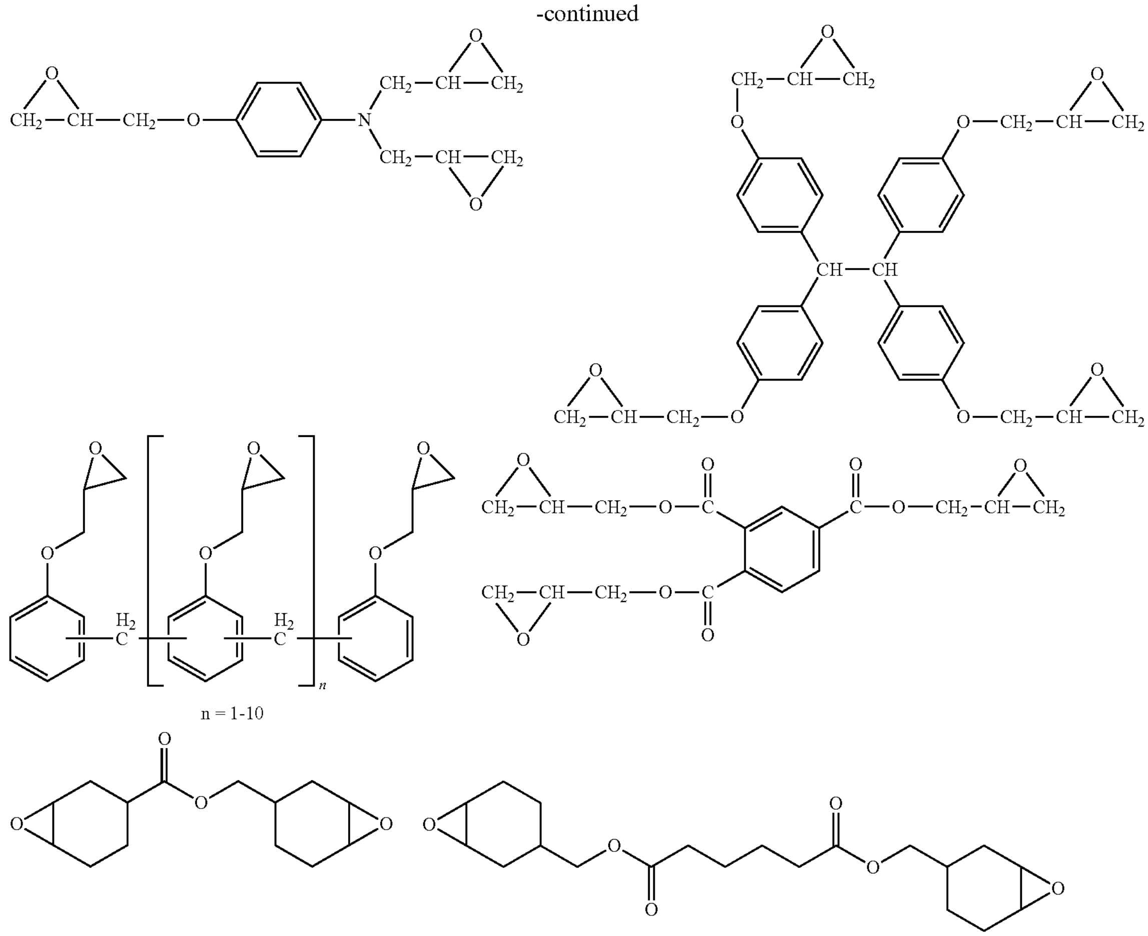

n = 1-10

Suitable antistatic agents are, for example, ethoxylated alkylamines, fatty acid esters, alkylsulfonates, and polymers such as polyetheramides.

Suitable antiozonants are the above-mentioned amines such as N,N'-di-isopropyl-p-phenylenediamine, N,N'-di-sec-butyl-p-phenylenediamine, N,N'-bis(1,4-dimethylpentyl)-p-phenylenediamine, N,N'-dicyclohexyl-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, and N-cyclohexyl-N'-phenyl-p-phenylenediamine.

Suitable mold release agents are, for example, montan waxes.

The additive composition according to the invention and optionally additional additives are incorporated into the plastic through conventional processing methods, wherein the polymer is melted and mixed with the additive composition according to the invention and the optionally further additives, preferably using mixers, kneaders or extruders. Extruders, such as single-screw extruders, twin-screw extruders, planetary roller extruders, ring extruders, co-kneaders, which are preferably equipped with vacuum degassing, are preferred as processing machines. The processing can take place here under air or, optionally, under inert gas conditions.

Furthermore, the additive compositions according to the invention can be contained, produced and introduced in the form of so-called masterbatches or concentrates comprising, for example, 10-90% of the compositions according to the invention in a polymer.

The present invention furthermore relates to a moulding compound or a moulded part producible or produced from the condensation polymer composition according to the invention, in particular in the form of films, in particular agricultural films, such as mulch films, tunnel films or perforated films, tapes, hollow bodies and foams, injection-moulded parts, fibres, profiles and other extrudates, parts made using additive or generative manufacturing processes such as fused layer modelling (FLM), layer laminate modelling (LLM), selective laser sintering (SLS) and other 3D printing processes, packaging for food or cosmetic products, encapsulations of active agents and biologically active substances, dressing materials, surgical sutures and/or hygiene products, in particular as a component of disposable nappies, sanitary towels and tampons.

In a further embodiment the present invention relates to a method for the hydrolytic degradation of condensation polymers, in which an above-described additive composition according to the invention is added to the condensation polymer and the added composition is exposed to a hydrolysing condition. The hydrolysis conditions are provided if the plastic composition comes into contact with water, for example on account of air humidity, in particular high air humidity >30%, in particular also in sewage plants, in the composting of waste materials, and generally in the environment, for example in rivers and oceans.

The present invention additionally relates to the use of an above-described additive composition according to the invention for accelerating the hydrolysis of a condensation polymer supplemented by the additive composition when the supplemented condensation polymer is exposed to hydrolysing conditions, compared with a condensation polymer not supplemented by the additive composition.

It is particularly advantageous here that the described use of the additive composition according to the invention simultaneously allows a processing stabilisation under aprotic conditions of the thermoplastic polymers into which it is incorporated, and at the same time an acceleration of the hydrolytic degradation of the condensation polymers under protic conditions in the specific application.

The present invention furthermore relates to the use of the condensation polymer composition

- for the manufacture of packaging, in particular packaging for foods or cosmetic products;
- in the pharmaceutical industry, in particular for the encapsulation of active agents and biologically active substances;
- in medical technology, in particular for the manufacture of dressing material and surgical suture material;
- in hygiene products, in particular as a component of disposable nappies, sanitary towels, and tampons; and/or
- in agricultural applications, e.g. for the manufacture of agricultural films such as mulch films, tunnel films, or perforated films.

The present invention will be explained in greater detail with reference to the following embodiments, without limiting the invention to the specific parameters.

EMBODIMENTS

Luminy L 175 (≤0.5% D-lactic acid in accordance with the certificate, MVR=4.7 $cm^3$/10 min, measured at 190° C./2.16 kg stamped weight) of the company of Corbion was used as PLA.

The polymers were dried at 80° C. in a vacuum drying cabinet for at least 16 h before processing.

The manufacture of the examples in accordance with the invention and of the comparison examples was accomplished by extrusion using a parallel twin screw extruder "Process 11" of the company Thermo Scientific, having a screw diameter of 11 mm and a length to diameter ratio (LD) of 40.

The additives were mixed manually with the matrix polymer in a plastic bag and dosed by volume. The processing was carried out at a throughput of 1 kg/h and a screw speed of 200 r.p.m. at 200° C.

To check the hydrolysis rate, the polymer was stored in deionised water as pellets at 35 and 58° C. and the MVR was determined after various times.

The measurement of the MVR was carried out on a melt index test unit MI-2 of the company Göttfert at a test temperature of 190° C. and a stamp weight of 2.16 kg. The samples were dried for at least 16 h in the vacuum furnace at 80° C. prior to the measurement. The preheating time amounted to 4 minutes. The MVR is indicated in $cm^3$/10 min.

TABLE 1

| Immersion in water at 58° C. | | | | | |
|---|---|---|---|---|---|
| Example | Additive | MVR after extrusion | MVR after 48 h immersion in water | MVR after 96 h immersion in water | MVR after 168 h immersion in water |
| Comparison example 1 | Without additive | 5.4 | 13.7 | 26 | 66 |
| Example 1 in accordance with the invention | 0.1% sodium citrate + 0.4% phosphite | 7.5 | 31 | 84 | 300 |
| Example 2 in accordance with the invention | 0.25% sodium citrate + 0.25% phosphite | 5.3 | 17.2 | 44 | 117 |
| Example 3 in accordance with the invention | 0.4% sodium citrate + 0.1% phosphite | 4.6 | 11.4 | 22 | 51 |

TABLE 2

| water storage at 35° C. | | | | | | |
|---|---|---|---|---|---|---|
| Example | Additive | MVR after extrusion | MVR after 2 weeks immersion in water | MVR after 4 weeks immersion in water | MVR after 6 weeks mersion in water | MVR after 8 weeks mersion in water |
| Comparison example 2 | Without additive | 5.4 | 11.0 | 15.4 | 22 | 29 |
| Example 4 in accordance with the invention | 0.1% sodium citrate + 0.4% phosphite | 7.5 | 40 | 87 | 149 | 238 |

The phosphite used was Weston 618F (manufacturer: SI Group) of the following structure:

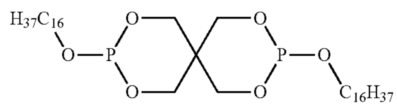

The combinations of hydroxycarboxylic acid salts and phosphorous compounds used in the examples according to the invention demonstrate a control and management of the degradability of PLA under protic conditions, depending on the ratios of the two components. Due to an excess or the same concentration of phosphorous compound in relation to the hydroxycarboxylic acid, an accelerated degradation is achieved with good processing stability (Examples 1 and 2 in accordance with the invention, increased MVR after immersion in water compared to the Comparison example). If, however, a delay of the degradability is desired, it is possible to achieve this by using an excess of the hydroxycarboxylic acid salt (Example 3 in accordance with the invention). Due to the ratio of hydroxycarboxylic acid salt and phosphite, the hydrolysis of the condensation polymers can thus be controlled and therefore adjusted in accordance with the potential application.

The invention claimed is:

1. A method for increasing the hydrolytic degradation of a condensation polymer, the method comprising adding an additive composition comprising a) at least one hydroxycarboxylic acid salt and b) at least one organic phosphorus compound selected from the group consisting of

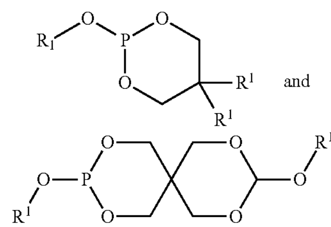

and wherein $R^1$ at each occurrence is the same or different and is selected from the group consisting of linear or branched alky groups with 1 to 36 carbon atoms and aryl groups to the condensation polymer and the condensation polymer added with the additive composition is exposed to a hydrolysing condition, wherein the condensation polymer is selected from the group consisting of:

polyesters of aliphatic or aromatic dicarboxylic acids and diols or of hydroxycarboxylic acids or their cyclic esters or diesters, and copolymers and mixtures or blends of two or more of the aforementioned polymers;

polycarbonates or polyester carbonates;

and mixtures, combinations or blends of two or more of the aforementioned polymers.

* * * * *